Patented Feb. 19, 1946

2,394,989

UNITED STATES PATENT OFFICE 2,394,989

MANUFACTURE OF CELLULOSE

Henry Dreyfus, London, England; Claude Bonard administrator of said Henry Dreyfus, deceased No Drawing. Application March 9, 1943, Serial No. 478,539. In Great Britain March 11, 1942

4 Claims. (Cl. 92—9)

This invention relates to improvements in the manufacture of cellulose from wood and other cellulose-containing materials.

As is well known, wood and other cellulose-containing materials in their natural state contain a number of other constituents, particularly lignin and pentosans and other hemi-celluloses, which must be removed before a cellulose is obtained which is sufficiently pure for most of the industrial purposes for which cellulose is required, for example for the production of paper, viscose, nitro-cellulose, cellulose acetate and other cellulose derivatives. Various methods are known for the treatment of cellulosic materials, the most important of these being the sulphite, soda and sulphate processes. These methods give the well known chemical wood pulps which in general require further treatments to obtain a cellulose of good colour containing a high percentage of alpha-cellulose.

According to the present invention cellulose-containing materials are treated with an oxidising agent in the presence of an organic acid and of an oxidation catalyst which can subsequently be removed from the materials by solution in the organic acid.

The process is applicable to the treatment of all types of wood, both of a deciduous and non-deciduous character, as well as of other types of cellulosic materials, e. g. straws and grasses. For example, the wood of ash, oak, elm, poplar, birch, beech, larch, pine, spruce or fir may be treated. Preferably the wood or other material is treated in a finely divided state, for instance in the form of sawdust or small chips. The treatment with the oxidising agent may be assisted, and its consumption reduced, by first treating the cellulosic material with dilute alkali, for example by boiling it with a 1% caustic soda solution. Such boiling may for example be carried out for about an hour.

As the oxidising agent, it is preferred to employ hydrogen peroxide, but other sources of oxygen, for example, metal peroxides, especially alkali and alkaline earth metal peroxides such as sodium peroxide and barium peroxide, may be used, as may free oxygen or air; such other oxidising agents may also be used in association with hydrogen peroxide.

The organic acid used is preferably a lower fatty acid, for example butyric acid, propionic acid and especially acetic acid. Acetic acid, for example, may be used in concentrations of about 25, 50 or 75% or more, concentrations between about 40 and 60% being usually found most satisfactory. The ratio of liquid to cellulosic material may, for example, be 10, 15 or 20 to 1. The amount of oxidising agent necessary will depend to some extent on the nature of the wood or other cellulosic material; for example when hydrogen peroxide is employed proportions of between about 70 and 100 or 120% of the weight of the material are usually required. The reaction temperature may be between about 40° and 70° C. and the treatment may last for about 4 to 6 hours.

As the oxidation catalyst there may be employed a salt of cobalt, nickel, iron, chromium, aluminium and especially of manganese. Preferably a salt of an organic acid and in particular a salt which is soluble in the reactant medium is used, and the acetates, especially manganese acetate, have been found to give particularly good results. The amount of catalyst used may for instance be 5, 10 or 15% of the weight of the wood or other cellulose-containing material.

In a modification of the invention the organic acid and the catalyst may be replaced by ammonia. Thus, for example, wood or other cellulosic material may be subjected to treatment with a solution of hydrogen peroxide in aqueous ammonia, under reaction conditions similar to those set out above with respect to the amount of hydrogen peroxide, the temperature and the time of reaction.

The principal effect of the treatment is to oxidise the lignin of the wood or other cellulosic material and to render it soluble in dilute alkali. After the oxidation treatment has been completed, therefore, the cellulosic material may be treated for a short time with a hot dilute solution of alkali to dissolve out the oxidation products; for example it may be boiled with a solution of ½ or 1% sodium hydroxide, and then thoroughly washed. It may then be treated at ordinary temperature with a mercerising solution of 9 to 15% sodium hydroxide in order to remove hemi-celluloses and this treatment may, if required, be repeated several times. In this manner a cellulose having a high alpha-cellulose content and free from substantial quantities of lignin, pentosans and other impurities may be produced. This product may be used for purposes such as papermaking, or it may be converted into viscose, cellulose nitrate or organic esters or ethers of cellulose, e. g. cellulose acetate.

The following example illustrates the invention without in any way limiting it:

Example

One part of elm sawdust is boiled for about an hour with a 1% solution of sodium hydroxide and then, after washing, is immersed in 12 parts of 45% acetic acid containing 0.8 part of hydrogen peroxide and 0.1 part of manganese acetate. It is heated in this solution for about 4 hours at 70° C. and, after separation from the liquor, boiled for 15 to 30 minutes with ½% solution of sodium hydroxide. Finally, it is mercerised for ½ hour with 8 parts of a 12% solution of sodium hydroxide and the treatment repeated until the pentosan content has been reduced to a low figure. The wood is then washed and may be employed for the production of cellulose derivatives, for paper-making or for other purposes.

Having described my invention what I desire to secure by Letters Patent is:

1. In a process for the manufacture of cellulose from cellulose-containing material, the steps of subjecting the material first to the action of a boiling 1% aqueous solution of a caustic alkali for about one hour, then at a temperature between 40 and 70° C. for from 4 to 6 hours to the action of 70–120% of its weight of hydrogen peroxide, in the presence of aqueous acetic acid of 40–60% concentration which contains in solution manganese acetate in amount 5–15% of the weight of the material, and then to the action of a boiling ½ to 1% aqueous solution of a caustic alkali for 15 to 30 minutes.

2. A process for the manufacture of cellulose from cellulose-containing material, which comprises converting non-cellulosic constituents of the material into a form in which they are soluble in a boiling sodium hydroxide solution of concentration ½ to 1% by treating the materials at a temperature of 40 to 70° C. with 70 to 120% of its weight of hydrogen peroxide in the presence of aqueous acetic acid of concentration 40 to 60% containing in solution an acetate of a metal of atomic number 25 to 29 in amount 5 to 15% of the weight of the material, the ratio of liquid to the material being between 10:1 and 20:1, and subsequently boiling the material with a ½ to 1% aqueous alkali metal hydroxide solution.

3. A process for the manufacture of cellulose from cellulose-containing material, which comprises converting non-cellulosic constituents of the material into a form in which they are soluble in a boiling sodium hydroxide solution of concentration ½ to 1% by treating the materials at a temperature of 40 to 70° C. with 70 to 120% of its weight of hydrogen peroxide in the presence of aqueous acetic acid of concentration 40 to 60% containing in solution manganese acetate in amount 5 to 15% of the weight of the material, the ratio of liquid to the material being between 10:1 and 20:1, and subsequently boiling the material with a ½ to 1% aqueous alkali metal hydroxide solution.

4. A process for the manufacture of cellulose from cellulose-containing material, which comprises treating the material for about an hour with a boiling 1% aqueous solution of sodium hydroxide, then converting non-cellulosic constituents of the material into a form in which they are soluble in a boiling sodium hydroxide solution of concentration ½ to 1% by treating the materials at a temperature of 40 to 70° C. with 70 to 120% of its weight of hydrogen peroxide in the presence of aqueous acetic acid of concentration 40 to 60% containing in solution manganese acetate in amount 5 to 15% of the weight of the material, the ratio of liquid to the material being between 10:1 and 20:1, and subsequently boiling the material with a ½ to 1% aqueous alkali metal hydroxide solution.

HENRY DREYFUS.